Jan. 1, 1957
A. E. ANDERSON
2,775,955
AIR INJECTION MILKING MACHINE DEVICE
Filed Sept. 7, 1951
3 Sheets-Sheet 1
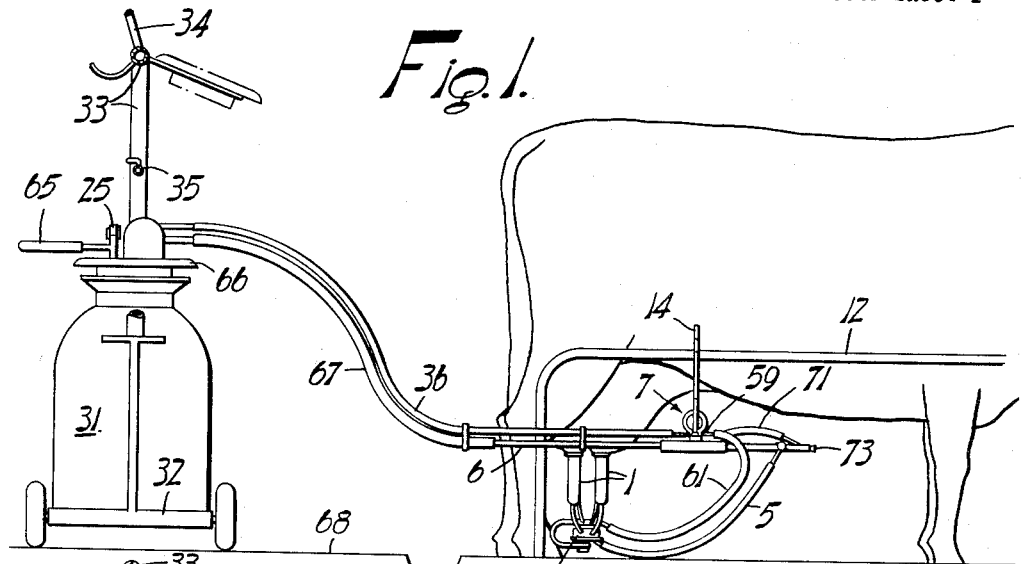
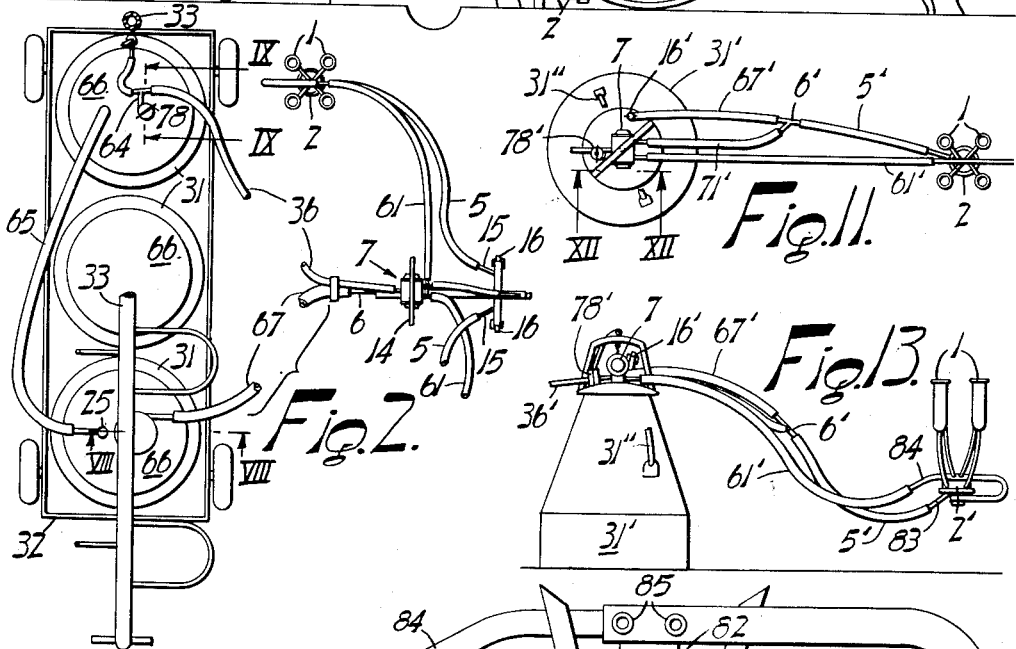
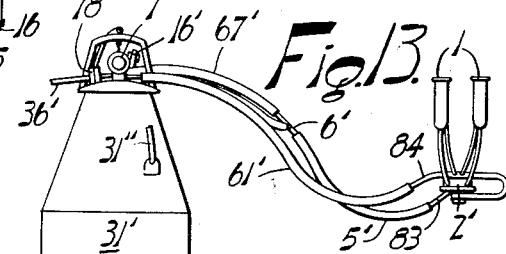
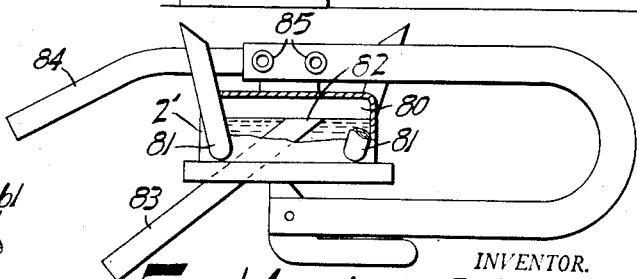
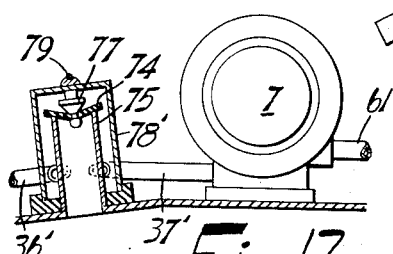
INVENTOR.
Austin E. Anderson
BY
Bean, Brooks, Buckley & Bean
ATTORNEYS Jan. 1, 1957    A. E. ANDERSON    2,775,955
AIR INJECTION MILKING MACHINE DEVICE
Filed Sept. 7, 1951    3 Sheets-Sheet 2
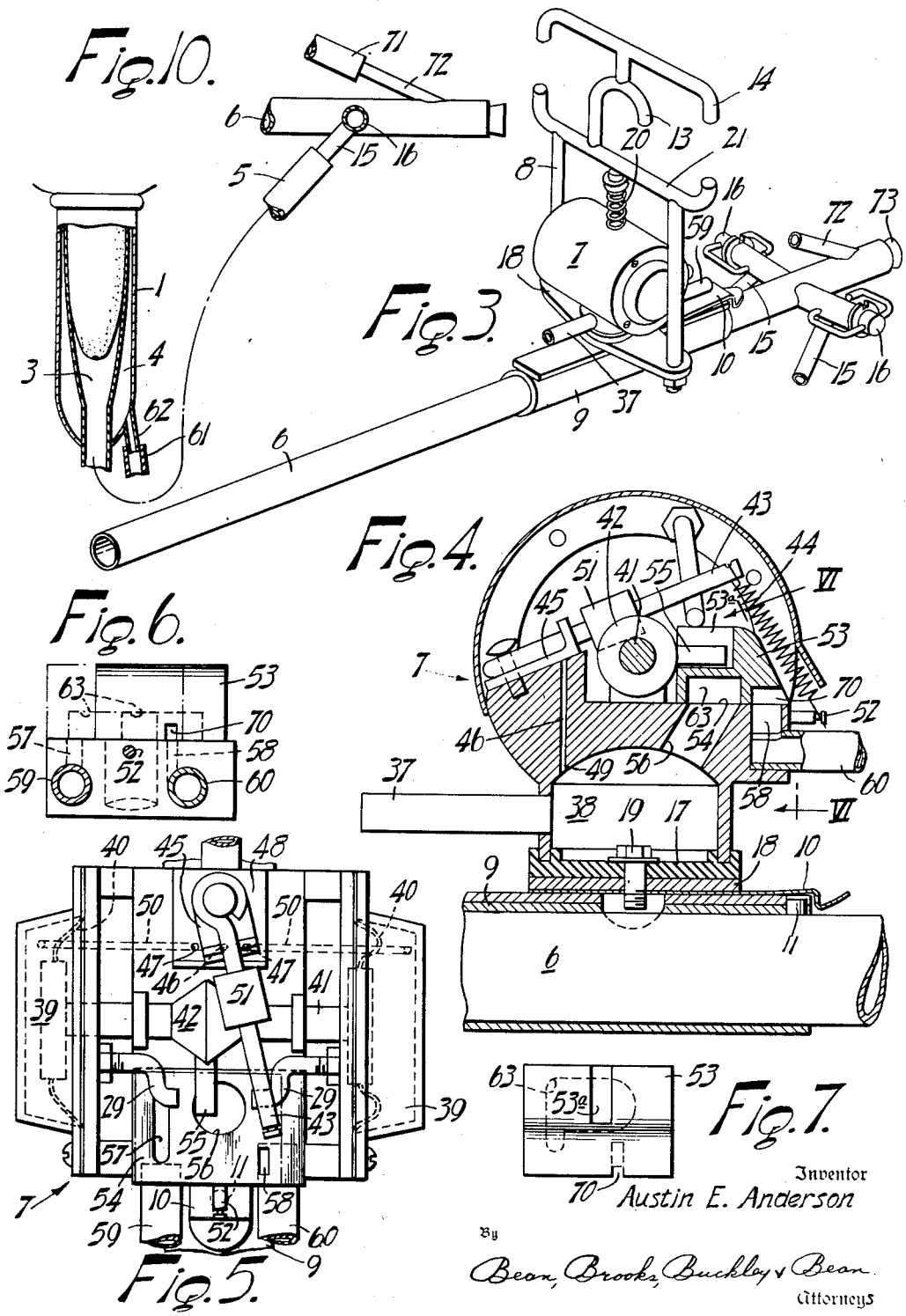
Inventor
Austin E. Anderson
By
Bean, Brooks, Buckley & Bean
Attorneys

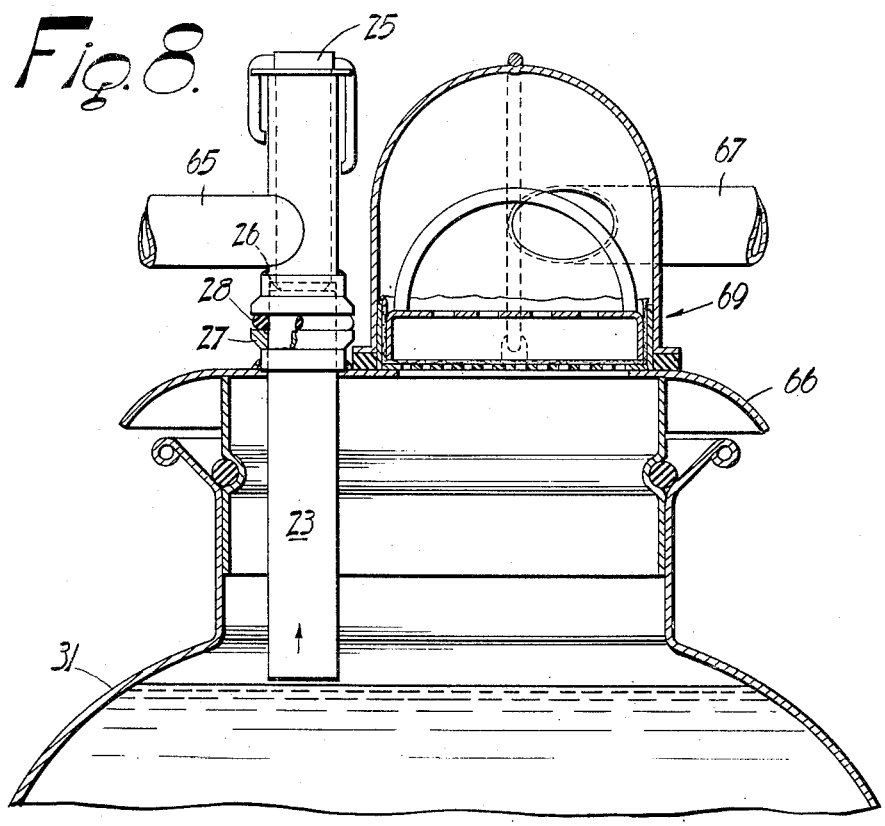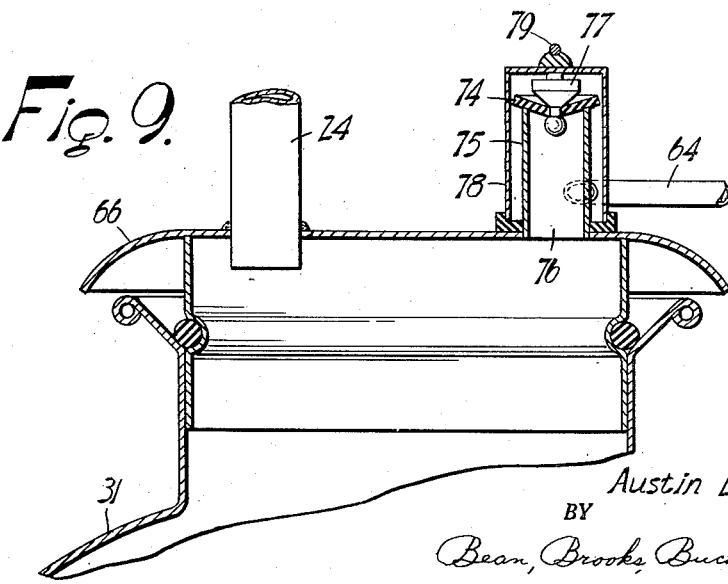

United States Patent Office 2,775,955
Patented Jan. 1, 1957

2,775,955

AIR INJECTION MILKING MACHINE DEVICE

Austin E. Anderson, Jamestown, N. Y.

Application September 7, 1951, Serial No. 245,494

2 Claims. (Cl. 119—14.36)

This invention relates to the milking machine art and it has for its primary object to provide a milker which will facilitate and expedite the production and collection of the milk.

Ordinarily, the milk is delivered from the teat cups into a receiver forming a part of the milking machine, from which receiver the milk is poured into a pail and from thence into a shipping container through an open strainer, necessitating the use of three receivers and the exposure of the milk to the atmosphere of the barn or milking shed.

In accordance with the present invention the milk is delivered through a closed system from the teat cup to the storage or shipping container without handling by the attendant and in a manner to preclude the passage of foreign matter to the milk. With this thought in mind it is possible in the use of this system to have the shipping container arranged on a portable carrier or cart at a remote point from the cow and the milk conveyed through a closed conduit from the teat cup to the container.

A further object of the invention is to provide an improved milker in which the flow of milk from the teat cups is encouraged through the intermittent application of air impulses to the milk stream which air injections serve a dual purpose, first to force the milk toward the receiver to preclude the possibility of the milk backing up in the conduit and hindering the efficient operation of the milker and, second, to provide a controlled periodic variation in the suction applied to the cow's teat for maintaining the circulation of blood therein. This momentary break in an otherwise constant vacuum has a beneficial effect on the cow in that it relieves the tension on her teats and allows the blood to circulate back into the body more freely.

Again, the invention has for its object to provide a milker which will give more positive assurance against milk contamination from the air passages.

The foregoing and other objects will manifest themselves as this description progresses, reference being made to the accompanying drawing, wherein Fig. 1 is an illustration depicting the improved milker in operation;

Fig. 2 is a plan view of the milker with portions removed;

Fig. 3 is an enlarged perspective view of the pulsator-manifold unit designed to be suspended adjacent the cow;

Fig. 4 is an enlarged transverse sectional view through the pulsator showing more clearly its mounting upon the manifold;

Fig. 5 is a plan view of the pulsator body with the cover removed and portions broken away;

Figs. 6 and 7 are detail views of the pulsator valve and its mounting;

Fig. 8 is an enlarged sectional view about on line 8—8 of Fig. 2;

Fig. 9 is a similar view to Fig. 8 about on line 9—9 of Fig. 2;

Fig. 10 is a fragmentary diagrammatic view illustrating the relation of a teat cup to the manifold;

Fig. 11 is a plan view similar to Fig. 2 but showing the application of the present invention to the present day milking machine;

Fig. 12 is an enlarged fragmentary view partly in cross section about on line 12—12 of Fig. 11;

Fig. 13 is a plan view of the embodiment of Fig. 11; and

Fig. 14 is an enlarged side view, partly in section of a modified claw construction.

Referring more particularly to the drawing, the numerals 1 designate the teat cups grouped in a cluster and connected to the claw 2, each cup having the usual inner teat chamber 3 and the outer pressure pulsating chamber 4. The teat chamber is connected by a flexible milk-draining hose 5 to an impulse injector 6 which in the preferred embodiment may consist of a length of pipe serving as a manifold to accommodate plural claws and to support a common pulsator 7. The pulsator is carried within a frame 8 which in turn is mounted upon a sleeve 9 onto which the injector 6 is slid where it is positioned by a spring latch 10 engaging over a stud 11. The entire unit is designed for being suitably suspended, as from an overhead support or from a partition rail 12 between the animal stalls, by a hook 13 to which the carrying handle 14 is conveniently fixed. The impulse injector has nipples 15 to each of which is attached a milk hose 5 leading from a respective cup cluster 1, each nipple preferably incorporating a valve 16 by which the manifold passage may be closed off from the cups when not in use. These valves may be like those disclosed in my copending application Serial No. 159,116, now Patent No. 2,723,829, issued November 15, 1955. A gasket 17 is secured to the lower cross bar 18 of the frame 8 by a screw 19 to seal the underside of the pulsator. The pulsator is removably held in place within the frame 8 by a compression spring 20 reacting against the upper cross bar 21. By removing the spring the pulsator may be readily removed.

In accordance with the form of the invention disclosed in Figs. 1 through 10, the milk is discharged from the teat cups directly into a shipping or storage can 31. Therefore, a cart 32 may be provided to handle plural shipping cans. The frame of the cart may embody a pipe section 33 that forms a part of the usual suction supply line 34 having one or more valved fittings 35 to which the suction hose 36 is selectively engageable. This hose leads through a nipple 37 to the low pressure chamber 38 of the pulsator.

The pulsator may be of suitable form, such as that disclosed in my earlier Patent No. 2,304,746, the same having opposed motor chambers 39 in which operate diaphragms 40 that are joined by a rod 41 to move as a unit in shifting its fixedly carried cam 42 underneath the valve shifting lever 43 against the action of the coiled spring 44. This arrangement provides a snap-action for moving the motor valve 45 back and forth between its two operative positions for connecting the supply port 46 with one or the other of the two chamber ports 47 opening through the valve seat 48. The suction supply port 46 communicates with the low pressure chamber 38 by a duct 49, while the chamber ports 47 open into the chambers 39 through ducts 50. An anti-friction roller 51 facilitates the camming action to lift the lever 43. The spring 44 is shown anchored on pin 52.

The valve for controlling the pressure pulsations in the teat cups is shown at 53, the same being slid back and forth on its seat 54 by a rod-carried pin 55 engaging in a recess 53a. The seat has a supply port 56 and two other ports 57 and 58 opening through nipples 59 and 60, respectively. The port 57 communicates with the outer chamber of each teat cup through a hose 61 and cup nipple 62, Fig. 10. The valve 53 has a recess 63 to connect the supply port 56 to the port 57 at intervals in alternation with ventings to the atmosphere, when the latter port is uncovered, for creating the pressure pulsations in the outer chamber 4 of the teat cup. The teat chamber 3 is in open communication with the suction source through the milk receiver 31 and a branch passage 64 from the suction hose 36.

Where there are two or more cans on the cart 32 intercommunication between the cans may be had by a conduit 65 that joins the nipples 23 and 24, Figs. 8 and 9, on the can covers 66 to equalize the pressure, either or both nipples embodying a valve 25, similar to valve 16, for closing on its seat 26. This intercommunication between the milk cans is also utilized to automatically transfer excess milk from the first can to the next to avoid the waste of overflow. For this purpose the nipple is extended down into the can to the desired level. Therefore, when the milk level rises to cover the lower end of the nipple 23, which constitutes a level-determining tube, a predetermined level will be maintained in the first can since all excess milk will be drawn up through the tube and the passage 65 into the next can. The level may be regulated by adjustably mounting the tube 23 in a collar 27 on the cover and sealing the sliding fit by a rubber gasket 28.

When the milker is in use, the pulsator-injector unit is hung upon the stall frame by the hook 13 with the elongate manifold body being connected by a milk-draining conduit 67 to one of the receivers 31 on the cart, which latter can be wheeled in the aisle 68 between the rows of stalls. In practice, the milk will be discharged from the drain hose 67 preferably into a strainer 69 on top of the receiver so that the milk can will be ready for cooling and shipping when filled.

In order to maintain the milk-flow from the cups to the receiver, the milk line which is under a suction influence is intermittently subjected to a pressure impulse. According to this invention the impulse is accomplished by admitting or injecting small increments of atmospheric air into the line. To this end, the pulsator valve 53 is provided with a small venting passage 70 which is designed for momentary registry with the port 58 when the valve is in one of its two limit positions, and preferably when the port 57 is uncovered to the atmosphere. The nipple 60 is connected by a hose 71 to the nipple 72 on the manifold 6 adjacent the valves 16. The restricted capacity of this momentary venting has the effect of reducing the suction in the manifold and thereby creates a pressure differential upon the body of milk within the milk-flow passage 67 to force it on toward the receiver 31. This air impulse serves to maintain the long drain passage clear of any trapped quantities of milk.

The momentary venting of the milk passage is also beneficial to the cow in that the small amount of the atmosphere which is admitted serves to reduce the degree of suction and thereby relieves the tension on the teat to permit the blood to circulate back into the body of the cow more freely and to maintain the circulation in the teats. The relief from the constant suction occurs at the time when the outer chamber is open to the atmosphere. The air injection interval is comparatively brief but may be varied by adjusting the stops 29 either individually or jointly. The stops may be connected together for joint adjustment.

The component parts of the milker are readily dismantled for cleansing, a closure plug 73 in the forward end of the manifold being removable to facilitate the washing of the long manifold passages.

The branch passage 64 may open into its receiver 31 through a check valve in the form of a rubber disk 74, Fig. 9, for seating upon the rim of an upstanding tube 75 as an annular valve seat to close the port 76 into the receiver. The valving disk carries an axial upstanding stem 77 by which it is depressed at its center into the seat upon placement of the housing 78 thereover. This arrangement enables the peripheral portion of the disk to yield upwardly for the evacuation of the air content of the receiver but to close firmly against the passage of foreign matter into the receiver from the suction line. Any milk which may have spilt out over the seat is thereby precluded from reentering the receiver. This affords a more positive assurance against milk contamination. The cover 78 may be secured in position by a bail 79 pivoted to the cover 66.

The air injector principle is equally efficient and effective in the presently used milkers. In Fig. 11 a modified impulse injector 6' is shown as a section of pipe incorporated in the drain line 5', 67' of an individual milking machine, the vacuum break being made by the pulsator 7 for momentarily admitting air through the hose 71' to the injector. This will create the flow-inducing pressure impulse for forcing the milk onwardly through the shut-off valve 16' into the usual receiver 31' having its carrying bail-type handle 31". The pulsating milking pressure will be transmitted to the outer chambers of the cups 1 through the pressure line 61'. The check valve 74 may be inserted in the suction passage 36', 37', the housing 78' being modified accordingly for the purpose.

The claw 2', Fig. 14, provided with a reservoir 80 into which the nipples 81 open from the teat cups. The outflow passage 82 from the reservoir chamber is elevated to determine the chamber capacity. The nipples 81 extend up above the level of the liquid in the chamber and have the upper ends beveled in the usual manner for being sealed off when the teat cups are not in use. The outflow nipple 83 is connected to the drain hose 5'. The suction hose 61 is attached to the nipples 84 which in turn open through nipples 85 in the chambers 4 of the cups.

The impulse injector 6 (6') is placed in the milk draining line at a location to afford a backing of milk for the air charge which latter acts both ways, in one direction to reduce the suction tension on the teats and, in the opposite direction to push the milk ahead toward the milk receiver. It is apparent that the reservoir chamber 80 may be located at a suitable point in the milk drain passage and not necessarily in the claw, the chamber being effectively provided by the long milk passage 5 in Fig. 1.

The improved milker is practical in that it expedites the production and handling of the milk whether the receiver has a single compartment, as in Fig. 11, or plural compartments, as in Fig. 2. It alleviates the constant strain and pressure upon the teats and encourages a natural milk flow. The milk is delivered from the teat cups directly to the receiver by the air impulse resulting from the intermittent breaks in the constant vacuum.

The foregoing description has been given in detail for clarity and ease of understanding and with no thought of limitation since the inventive principles involved are capable of assuming other physical embodiments without departing from the spirit of the invention and the scope of the appended claims.

What is claimed is:

1. A milker comprising a teat cup having a teat chamber and a pulsation chamber surrounding the teat chamber, a milk receiver, a flow line connecting the teat chamber with the receiver, a source of fluid under relatively high pressure and a source of fluid under relatively low pressure, a pulsation chamber, a valve alternately connecting the pulsation chamber to each of said sources of pressure, a conduit connecting the receiver continuously with the source of low pressure, said valve also controlling supplying of relatively high pressure fluid to the flow line from the teat chamber to the receiver to impart an impelling force to the flow of milk to the receiver.

2. A milker comprising a teat cup having a teat chamber, a pulsation chamber surrounding the teat chamber, a milk receiver, a flow line connecting the teat chamber with said receiver, two independent sources of fluid one under relatively high and one under relatively low pressure, a conduit connecting said sources to said pulsation chamber, a valve selectively controlling flow through said conduit, a conduit constantly connecting the receiver to the source of low pressure, and said valve also supplying relatively high pressure fluid to the flow line from the teat chamber to the receiver to impart an impelling force to the flow of milk to the receiver.

References Cited in the file of this patent

UNITED STATES PATENTS

| | | |
|---|---|---|
| 784,780 | Burrell | Mar. 14, 1905 |
| 951,403 | Lane | Mar. 8, 1910 |
| 1,195,997 | Leitch | Aug. 29, 1916 |
| 1,259,309 | Somers | Mar. 12, 1918 |
| 1,261,780 | Dinesen | Apr. 9, 1918 |
| 1,396,987 | Bodeker | Nov. 15, 1921 |
| 1,536,634 | Shippert et al. | May 5, 1925 |
| 1,776,909 | Hull | Sept. 30, 1930 |
| 2,509,214 | Cordis | May 30, 1950 |
| 2,512,094 | Duncan | June 20, 1950 |
| 2,585,178 | Sherwood | Feb. 12, 1952 |
| 2,651,290 | Hein | Sept. 8, 1953 |
| 2,683,437 | Merritt | July 13, 1954 |